(12) United States Patent
Takeda

(10) Patent No.: US 10,474,798 B2
(45) Date of Patent: Nov. 12, 2019

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Kyohei Takeda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 15/205,788

(22) Filed: Jul. 8, 2016

(65) Prior Publication Data

US 2017/0011207 A1 Jan. 12, 2017

(30) Foreign Application Priority Data

Jul. 10, 2015 (JP) .................................. 2015-138893

(51) Int. Cl.
*G06F 21/31* (2013.01)
*H04N 1/44* (2006.01)

(52) U.S. Cl.
CPC ........... *G06F 21/31* (2013.01); *H04N 1/4413* (2013.01); *H04N 2201/0094* (2013.01); *H04N 2201/3205* (2013.01); *H04N 2201/3208* (2013.01); *H04N 2201/3273* (2013.01); *H04N 2201/3276* (2013.01)

(58) Field of Classification Search
CPC ...................................................... G06F 21/31
See application file for complete search history.

(56) References Cited

U.S. PATENT DOCUMENTS

| 2003/0007464 A1* | 1/2003 | Balani ................ G06Q 30/0601 370/310 |
| 2005/0240294 A1* | 10/2005 | Jones ..................... A63B 57/00 700/92 |
| 2007/0083544 A1* | 4/2007 | Somogyi ................. G06F 9/466 |
| 2009/0253431 A1* | 10/2009 | Shi .................... H04L 29/12188 455/435.1 |

(Continued)

FOREIGN PATENT DOCUMENTS

JP 2012-254618 A 12/2012

*Primary Examiner* — John B King
*Assistant Examiner* — Carlos E Amorin
(74) *Attorney, Agent, or Firm* — Canon U.S.A., Inc. IP Division

(57) ABSTRACT

An information processing apparatus includes a registration unit, a display control unit, a login processing unit, and a restricting unit. The registration unit registers, as user information about a user who can log into the apparatus, user identification information for identifying the user as well as a display name displayed instead of the user identification information. When a list of user information registered is displayed, the display name as for a user whose display name has been registered and the user identification information as for a user whose display name is not registered is displayed. When the display name or the user identification information displayed is selected, login processing is executed through which a user corresponding to the thus selected name or information can log into the apparatus. The restricting unit restricts registration of the display name so that identical names are not displayed on the list of user information.

14 Claims, 15 Drawing Sheets

(56) References Cited

U.S. PATENT DOCUMENTS

| | | | |
|---|---|---|---|
| 2010/0064256 A1* | 3/2010 | Esaki | H04N 1/00413 715/825 |
| 2011/0235085 A1* | 9/2011 | Jazayeri | G06F 3/1204 358/1.14 |
| 2012/0005544 A1* | 1/2012 | Matsumoto | G06F 11/0733 714/57 |
| 2012/0059922 A1* | 3/2012 | Jason | H04L 12/14 709/223 |
| 2013/0198521 A1* | 8/2013 | Wu | G06F 21/6209 713/175 |
| 2014/0039846 A1* | 2/2014 | Aoyama | G06F 17/5072 703/1 |
| 2015/0106725 A1* | 4/2015 | Kamdar | H04L 61/3025 715/739 |
| 2015/0116756 A1* | 4/2015 | Mori | G06F 3/1204 358/1.14 |
| 2015/0365315 A1* | 12/2015 | Zou | H04L 45/02 370/254 |
| 2016/0110828 A1* | 4/2016 | Master | G06Q 50/184 705/310 |
| 2016/0173362 A1* | 6/2016 | Qu | H04L 45/026 370/401 |
| 2016/0219336 A1* | 7/2016 | Amano | G01C 21/3605 |
| 2016/0259602 A1* | 9/2016 | Dalaa | G06F 3/1204 |
| 2016/0261537 A1* | 9/2016 | Yang | H04L 51/12 |
| 2017/0228786 A1* | 8/2017 | Callahan | G06Q 30/0261 |
| 2017/0272316 A1* | 9/2017 | Johnson | G06Q 10/103 |

\* cited by examiner

FIG. 7

PERSONAL PRINT

UserA@D

| DOCUMENT NAME | PAGES | COPIES | TIME |
|---|---|---|---|
| ☐ DOCUMENT 1.doc | 10 | 1 | 15:00 |
| ☐ DOCUMENT 2.pdf | 100 | 2 | 16:25 |
| | | | |
| | | | |

[SELECT ALL]  [DELETE]  [START PRINTING]

700

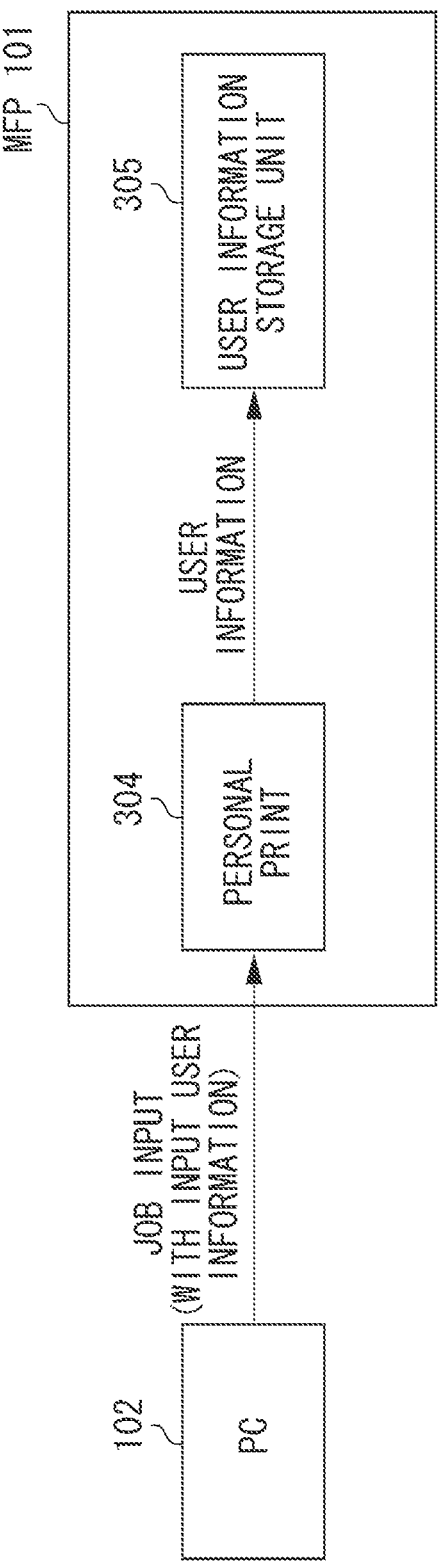

FIG. 11
| | USER NAME | DISPLAY NAME |
|---|---|---|
| 1101 | Administrator | |
| 1102 | UserA@D | A |
| 1103 | UserB@PcA | |
| 1104 | UserC | C |
| 1105 | UserD | |
ADD 1
ADD 2
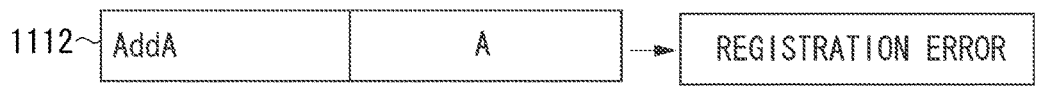
ADD 3
ADD 4
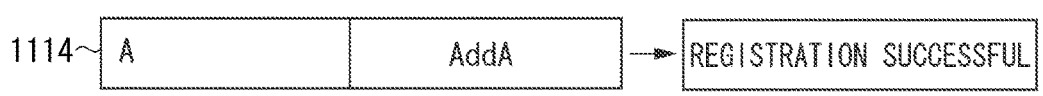

FIG. 13
| USER NAME | DISPLAY NAME |
|---|---|
| 1301 ~ Administrator | |
| 1302 ~ UserA@D | A |
| 1303 ~ UserB@PcA | |
| 1304 ~ UserC | C |
| 1305 ~ UserD | |
| 1306 ~ AddA | |
CHANGE SETTING 1
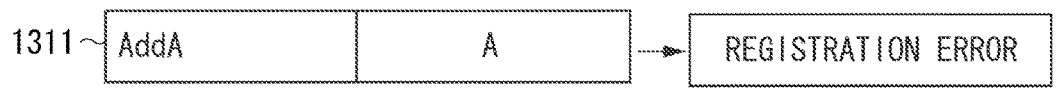
CHANGE SETTING 2
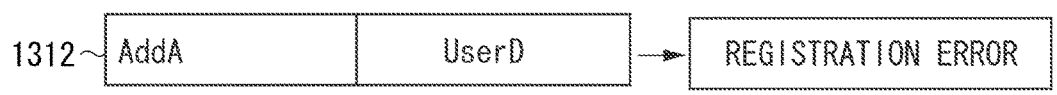
CHANGE SETTING 3
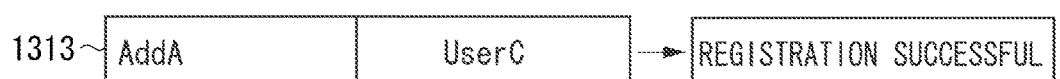

| | USER NAME | DISPLAY NAME |
|---|---|---|
| 1401 | Administrator | |
| 1402 | UserA@D | A |
| 1403 | UserB@PcA | |
| 1404 | UserC | C |
| 1405 | UserD | AddA |
| 1406 | AddA | AA |

CHANGE SETTING 4

1411  → REGISTRATION ERROR

INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present invention relates to an information processing apparatus, a control method of an information processing apparatus, and a storage medium.

Description of the Related Art

Multi-function peripherals (MFPs) are known, which have a plurality of applications for copying, printing, and sending scanned image, in addition, have a function of performing user authentication due to recent rise in security awareness. Some of such MFPs, serving as image forming apparatuses, are only usable after a user name and a password have been input.

Recently, the MFPs have been required to have a personalization function providing a service and contents optimized for each user. Examples of such personalization in the MFPs include personal printing. An application for the personal printing reserves a print job input from a personal computer (PC) of each user. When a user is authenticated and logs into the MFP, the application displays a list of jobs that have been input by the user, on an operation panel. The printing is started after a print command is received from the user. Another example of such an application sets a default screen for each user. The default screen is the first screen displayed in response to the login to the MFP. Thus, when a user logs into the MFP, the corresponding default screen thus set can be displayed.

The user authentication function described above requires a user to input the user name and the password through the operation panel. This operation is cumbersome for a user who wants to use the MFP immediately. Furthermore, the function imposes a large load for setting up a system environment and the like. Thus, some offices with an environment requiring no strict security may not employ the user authentication function. The personalized function is not available when the user authentication function is not employed. Regrettably, this policy of no authentication sacrifices usability of the operation which the personalized function provides to users.

In view of the above situation, a method discussed in Japanese Patent Application Laid-Open No. 2012-254618 enables a user to easily use the personalized function, while making the user operation performed in the user authentication function, less cumbersome. In Japanese Patent Application Laid-Open No. 2012-254618, a list of buttons, corresponding to user information registering users who can login, are displayed on an operation panel. This enables a user to log into the MFP by only selecting the button corresponding to his or her user information without inputting a password.

This configuration, in which the user can login by only selecting the button corresponding to his or her user information without inputting a password, has an advantage that the user can easily log into the MFP, but has a disadvantage that the user who has accidentally pressed a button corresponding to a wrong user logs in as another user. To prevent such wrong selection of buttons, information is preferably displayed on the buttons, enabling each user to easily identify his or her button.

In Japanese Patent Application Laid-Open No. 2012-254618, not only a user name for uniquely identifying a user but also a display name can be additionally registered. The display name is displayed on a button corresponding to a user whose display name has been registered, while the user name is displayed on a button corresponding to a user whose display name is not registered. When the display name is optionally registrable and can be displayed on the button, a user can more easily recognize his or her button.

If each user can freely register any display name, a plurality of buttons with the same name might be existing. For example, when a display name registered by a user is the same as a display name that has been already registered by another user, it would be difficult for them to recognize their buttons because there is a plurality of buttons with the name they have registered. Further, a plurality of buttons with the same name can exist also in a case where the display name newly registered by a user overlaps with a name of another user whose display name is not yet registered. This is the case not only where the display name is newly registered, but also where a registered display name is changed.

SUMMARY OF THE INVENTION

An information processing apparatus according to an aspect of the present invention includes a registration unit configured to register, as user information about a user who can log into the information processing apparatus, user identification information for identifying the user as well as a display name displayed instead of the user identification information, a display control unit configured to display, when a list of user information registered by the registration unit is displayed, the display name as for a user whose display name has been registered by the registration unit and the user identification information as for a user whose display name is not registered, a login processing unit configured to execute, when the display name or the user identification information displayed by the display control unit is selected, login processing through which a user corresponding to the thus selected display name or user identification information can log into the information processing apparatus, and a restricting unit configured to restrict registration of the display name by the registration unit so that identical names are not displayed on the list of user information by the display control unit.

Further features of the present invention will become apparent from the following description of exemplary embodiments with reference to the attached drawings.

BRIEF DESCRIPTION OF THE DRAWINGS

FIG. 7 is a diagram illustrating an example of a personal print screen.

FIG. 9 is a diagram illustrating a flow of user automatic registration by a personal print application.

FIG. 11 is a diagram illustrating patterns where registration is successful/fails when user information is newly added.

FIG. 13 is a diagram illustrating patterns where registration is successful/fails when user information is edited.

DESCRIPTION OF THE EMBODIMENTS

An exemplary embodiment of the present invention is described in detail below with reference to the drawings. The exemplary embodiment described below does not limit the invention to the claims. The solution provided by the present invention does not necessarily require all combinations of the features described in the exemplary embodiment.

<System Configuration>

Figure 1:
FIG. 1 is a diagram illustrating an overall configuration of a system.

FIG. 1 is a diagram illustrating an overall configuration of a system related to a multi-function peripheral (MFP) 101 serving as an image forming apparatus. The MFP 101 and a personal computer (PC) 102 are connected to each other via a local area network (LAN) 100, in such a manner as to communicate with each other. A print job is transmitted from the PC 102 to the MFP 101 via the LAN 100. The MFP 101 at least has a personal print function. Thus, the MFP 101 is capable of reserving a print job transmitted from the PC 102, displaying for a user who has logged into the MFP 101, a list of jobs that have been input by the user, and performing printing after receiving a print command from the user.

<Hardware Configuration>

Figure 2:
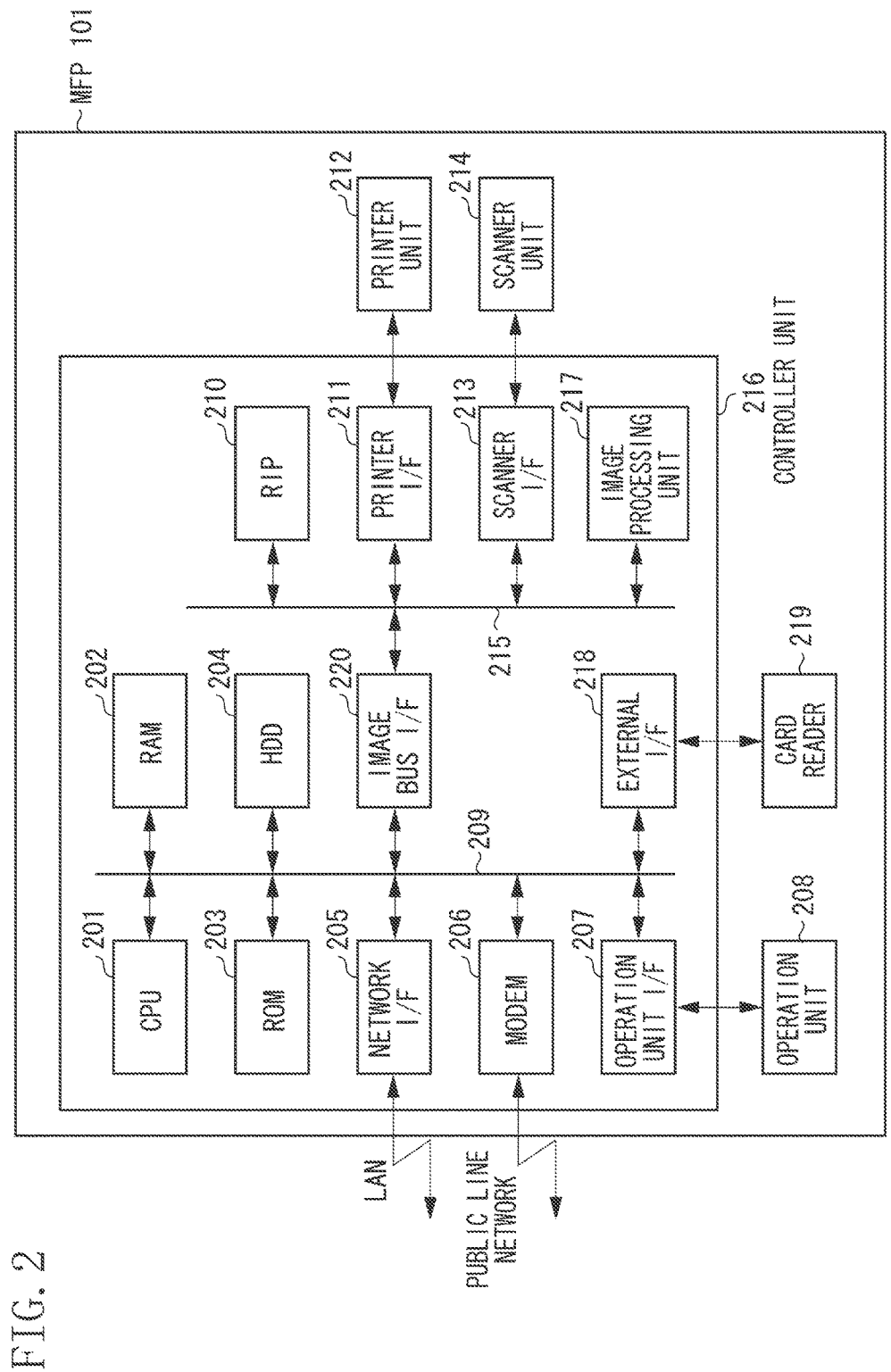
FIG. 2 is a block diagram illustrating a hardware configuration of a multi-function peripheral (MFP).

FIG. 2 is a diagram illustrating an example of a hardware configuration of the MFP 101.

In FIG. 2, a controller unit 216 is connected to a scanner unit 214 that functions as an image input device and a printer unit 212 that functions as an image output device. The controller unit 216 is further connected to a LAN or a wide area network (WAN) as a public line (such as a Public Switched Telephone Network (PSTN) or an Integrated Services Digital Network (ISDN), for example), and thus also receives and outputs image data and device information.

The controller unit 216 includes a central processing unit (CPU) 201 as a processor that controls the system as a whole. A random access memory (RAM) 202 is a system network memory used for operations of the CPU 201, and also serves as a program memory that stores a program and an image memory that temporarily stores image data.

A read only memory (ROM) 203 stores a boot program and various control programs for the system. A hard disk drive (HDD) 204 stores various programs for controlling the system, image data, user information required for user authentication/identification, and the like.

An operation unit interface (operation unit I/F) 207 is an interface unit for an operation unit (user interface (UI)) 208, and outputs image data to be displayed on the operation unit 208, to the operation unit 208.

The operation unit I/F 207 is configured to inform the CPU 201 of information (such as user information, for example) input from a user of the system through the operation unit 208. The operation unit 208 includes a display unit having a touch panel. The user can issue various instruction by pressing (by touching with his or her finger) a button displayed on the display unit.

A network interface (network I/F) 205 is connected to a network (LAN), and receives and outputs data. A modem 206 is connected to the public line, and performs data input/output such as FAX transmission/reception.

An external interface (external I/F) 218 receives an external input from a universal serial bus (USB), an IEEE 1394 interface, a printer port, RS-232C, and the like. A card reader 219 for integrated circuit (IC) required for authentication, for example, is connected to the external I/F 218. The CPU 201 controls reading of information from an IC card by the card reader 219 via the external I/F 218, and thus can acquire information read from the IC card. The devices described above are disposed on a system bus 209.

An image bus interface (image bus I/F) 220 is a bus bridge that connects between the system bus 209 and an image bus 215 that transmits image data at high speeds, and converts a data structure. The image bus 215 includes a peripheral component interconnect (PCI) bus or an IEEE 1394 interface. The devices described below are disposed on the image bus 215.

For example, a raster image processor (RIP) 210 rasterizes vector data such as a page description language (PDL) code into a bit map image. A printer interface (printer I/F) connects the printer unit 212 and the controller unit 216 and performs synchronous/asynchronous conversion for image data. A scanner interface 213 connects the scanner unit 214 and the controller unit 216 and performs synchronous/asynchronous conversion for image data.

An image processing unit 217 corrects, processes, and edits input image data, for example, and thus performs correction, resolution conversion, and the like on print output image data for the printer. The image processor 217 rotates image data, and executes compression/decompression processing using Joint Photographic Experts Group (JPEG) for multivalued image data and Joint Bi-level Image Experts Group (JBIG), Modified Modified READ (MMR), Modified Huffman (MH), and the like for bi-level image data.

The scanner unit 214 irradiates an image on a sheet of document with light, and scans the image with a charged-coupled device (CCD) line sensor, to generate raster image data. The scanner unit 214 performs an operation of reading the sheet of documents set in a document feeder and fed from the feeder one by one, under an instruction from the CPU 201, in response to a reading start command from the user of the MFP 101 issued through the operation unit 208.

The printer unit 212 converts the raster image data into an image on a recording medium, by electrophotography using a photosensitive drum or a photosensitive belt, or inkjet printing in which an image is directly printed on the sheet with ink discharged from a micro nozzle array. The printer unit 212 starts printing processing under an instruction from the CPU 201. The printer unit 212 includes a plurality of sheet feeding stages so that different sheet sizes and different sheet orientations can be selected, and includes sheet cassettes corresponding to the stages.

The operation unit 208 includes a liquid crystal display (LCD) on which a touch panel sheet is attached, and displays an operation screen for the system. When a key on the displayed screen is pressed, the operation unit 208 informs the CPU 201 of information on the pressed position through the operation unit I/F 207. The operation unit 208 includes various operation keys (hardware keys) such as a start key, a stop key, an identification (ID) key, and a reset key.

The card reader 219 reads information stored in an IC card, and notifies the CPU 201 of the information thus read through the external I/F 218, under the control performed by the CPU 201.

With the configuration described above, the MFP 101 can transmit the image data read with the scanner unit 214 onto the LAN 100, and can print and output print data, received from the LAN 100, with the printer unit 212.

Furthermore, the MFP 101 can transmit the image data, read with the scanner unit 214, onto a public line through FAX with the modem 206, and can output image data received from the public line through FAX, with the printer unit 212.

<Software Configuration>

Figure 3:
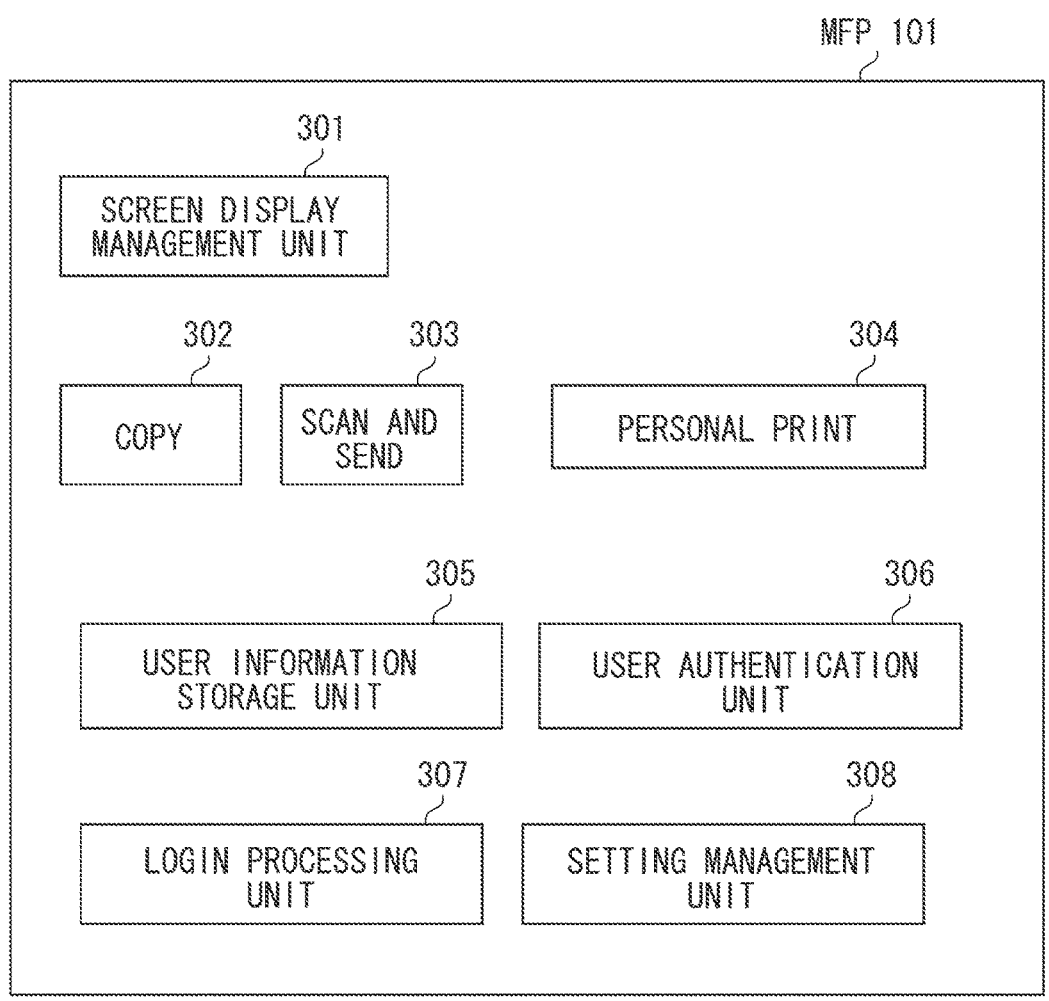
FIG. 3 is a block diagram illustrating a software configuration of the MFP.

FIG. 3 is a block diagram illustrating an example of a software configuration of the MFP 101.

A screen display management unit 301 controls what is to be displayed on the operation unit 208.

A copy application 302, a scan and send application 303, and a personal print application 304 are examples of applications that operate on the MFP 101. The copy application 302 is an application for executing copy processing performing printing with the printer 212 based on image data obtained by reading an image on a document with the scanner unit 214. The scan and send application 303 is an application for sending an image scanned with the scanner unit 214, to the external through an email or the like. The personal print application 304 is an application for reserving a print job input from the PC 102, displaying for a user who has logged into the MFP 101, a list of print jobs input by the user, and performing printing after a print command is received from the user.

A user information storage unit 305 stores user information related to a user who can log into the MFP 101. Table 1 illustrates an example of user information that can be stored in the user information storage unit 305.

TABLE 1

| User name | Display name | Password |
|---|---|---|
| Administrator | | abc123 |
| UserA@D | A | def |
| UserB@PcA | | ghi |
| UserC | C | jkl |
| UserD | | mno |

The user name is user identification information for uniquely identifying each user. The display name is a name set for display instead of the actual user name, on a user selection screen 400 illustrated in FIG. 4A, and can be optionally set. As will be described in detail below, the display name is displayed on the user selection screen 400 for the user whose display name has been set, whereas the user name is displayed on the user selection screen 400 for the user whose display name is not set. The password is authentication information used for the user authentication, and can be any value set by each user.

Figure 4:
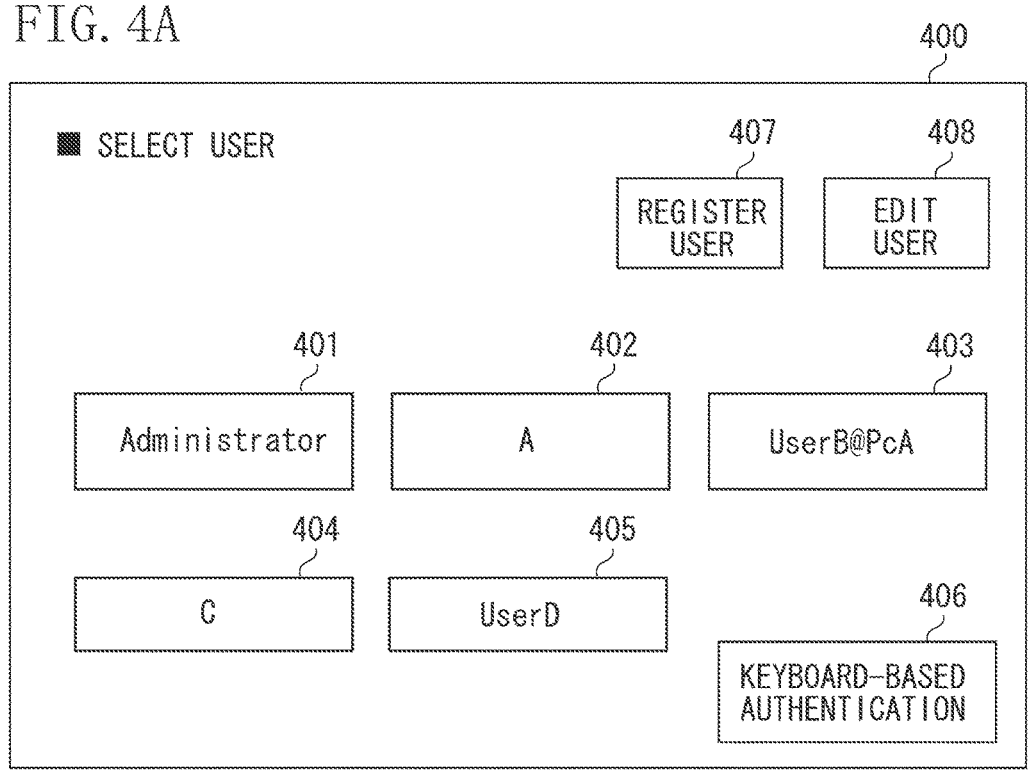
FIGS. 4A and 4B are diagrams illustrating examples of a user selection screen and a user authentication screen.

A user authentication unit 306 compares information input through a user authentication screen 409 illustrated in FIG. 4B, with the information stored in the user information storage unit 305, to perform the user authentication. The user authentication unit 306 can also compare information read from a card with the card reader 219, with the information stored in the user information storage unit 305 to perform the user authentication.

A login processing unit 307 executes login processing through which a user corresponding to a button selected on the user selection screen 400 logs into the MFP 101. The login processing unit 307 further executes login processing through which a user authenticated by the user authentication unit 306 logs into the MFP 101. A setting management unit 308 collectively manages various settings related to the MFP 101.

<Screen Examples>

FIG. 4A is a diagram illustrating an example of the user selection screen 400 on which a user that logs into the MFP 101 is selected. The user selection screen 400 is the first screen displayed on the operation unit 208 when the MFP 101 is booted. What is displayed on the user selection screen 400 includes buttons 401 to 405 each corresponding to user information stored in the user information storage unit 305, a keyboard-based authentication button 406, a user register button 407, and a user edit button 408. Display control is performed in such a manner as to present the display name on each one of the buttons 401 to 405 that corresponds to a user whose display name has been set, and the user name is displayed on each one of the buttons 401 to 405 that corresponds to a user whose display name is not set. In this example, the display names "A" and "C" are respectively presented on the buttons 402 and 405 corresponding to users with the user names "UserA@D" and "UserC" whose display names have been set as illustrated in Table 1. The user names are displayed on the buttons 401, 403, and 405 corresponding to other users whose display names are not set. When a user presses his or her button, the login processing for the MFP 101 is executed, and a main menu screen 500 illustrated in FIG. 5 is displayed.

When the keyboard-based authentication button 406 is pressed, the user authentication screen 409 illustrated in FIG. 4B is displayed. The user authentication screen 409 is a screen on which a user name and a password are input to make use of the user authentication function of the MFP 101. A user name field 410 is a field in which a user inputs his or her user name. A password field 411 is a field in which a user inputs his or her password. A login button is a button for issuing an instruction for login to the MFP 101. When the login button 413 is pressed, the user authentication unit 306 performs user authentication by checking whether the user information stored in the user information storage unit 305, includes a combination of the user name and the password that has been input through the operation unit 208. When the user authentication is successful, the login processing for the MFP 101 is executed, and the main menu screen 500 is displayed. A cancel button 412 is a button used for cancelling the user authentication on the user authentication screen 409. When the user presses the cancel button 412, the screen transitions to the user selection screen 400. Thus, the user who logs into the MFP 101 through the user authentication screen 409 needs to input his or her user name and password. A user who logs into the MFP 101 through the user selection screen 400 needs not to input his or her password, and can log into the MFP 101 by only pressing one of the buttons 401 to 405 corresponding to his or her user information.

Figure 10A:
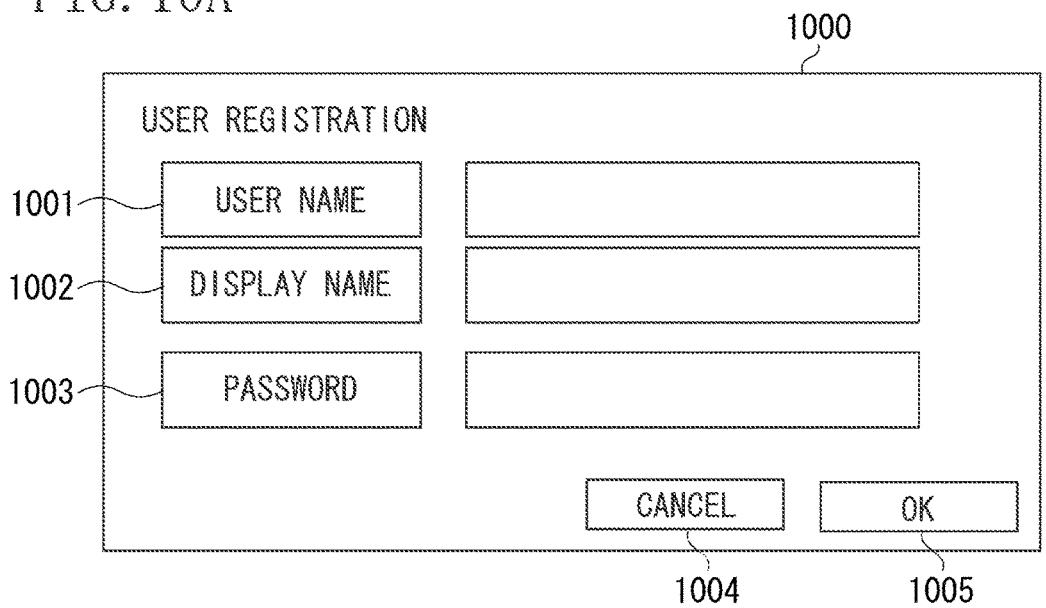
FIGS. 10A and 10B are diagrams illustrating examples of a registration screen and an editing screen for user information.

When the user register button 407 is pressed, a user registration screen 1000 illustrated in FIG. 10A is displayed. When the user edit button 408 is pressed, a screen for selecting a user on which user information is edited is displayed. When the user is selected on the screen, an editing screen 1010 (FIG. 10B) for editing the information of the selected user is displayed. How the user is registered and edited will be described below.

Figure 5:
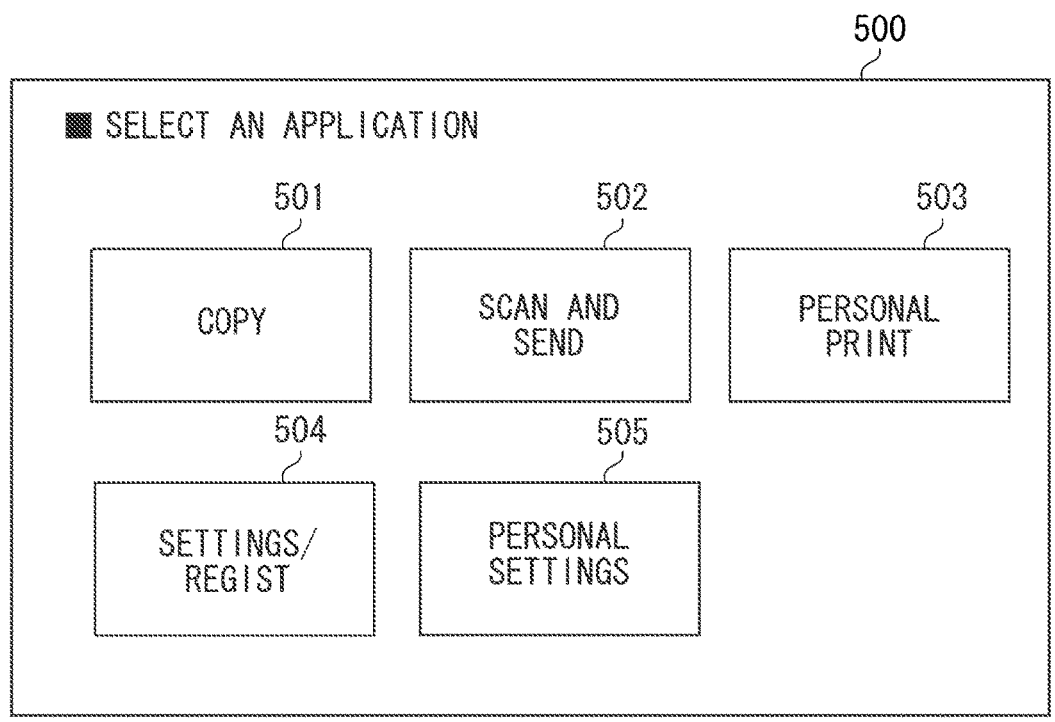
FIG. 5 is a diagram illustrating an example of a main menu screen.

FIG. 5 is a diagram illustrating an example of the main menu screen 500 on which a user selects a function he or she uses. On this screen example, application buttons 501, 502, and 503, as well as edit setting buttons 504 and 505 are registered. The buttons 501, 502, and 503 are used for starting various applications including the copy, scan and send, and personal print applications. The button 504 is used for editing the settings of the MFP 101. The button 505 is used for editing the settings of a logged in user. When one of the buttons on the main menu screen 500 is pressed, a screen for the function corresponding to the pressed button is called. For example, when the personal print button 503 is pressed, the personal print application starts for performing printing with the printer unit 212 based on the print job transmitted from the PC 102 and then reserved, and a screen illustrated in FIG. 7 is displayed on the operation unit 208. When the personal settings button 505 is pressed, a setting screen as illustrated in FIG. 6 is displayed, on which personal settings related to a user who has logged into the MFP 101 are set.

Figure 6:
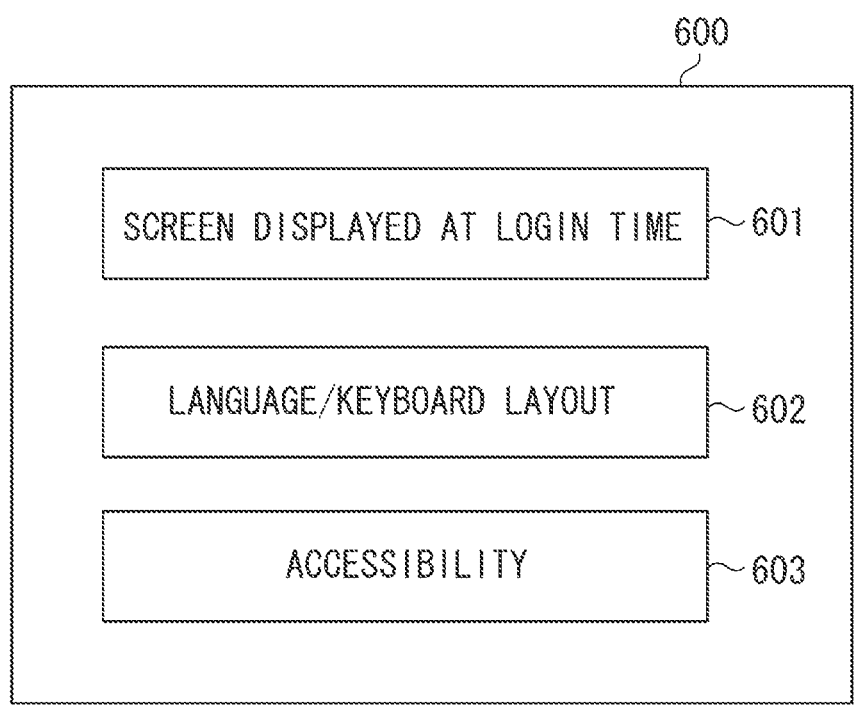
FIG. 6 is a diagram illustrating an example of a personal setting screen.

FIG. 6 is a diagram illustrating an example of a personal setting screen 600 displayed when the personal settings button 505 is pressed.

There are three settable personal settings items including "screen displayed at login", "language/keyboard layout", and "accessibility" respectively corresponding to buttons 601, 602, and 603.

The button 601 is used for setting a screen (hereinafter, referred to as a default screen) displayed at a time of logging-in. When the button 601 is pressed, a screen (not illustrated) for setting the default screen is displayed. With this screen, a user sets a desired screen as the default screen. For example, when the "main menu screen" is set as the default screen, the main menu screen as illustrated in FIG. 5 is displayed at the time of logging-in. When the "personal print" is set as the default screen, the screen for the personal print application as illustrated in FIG. 7 is displayed at login.

Figure 8:
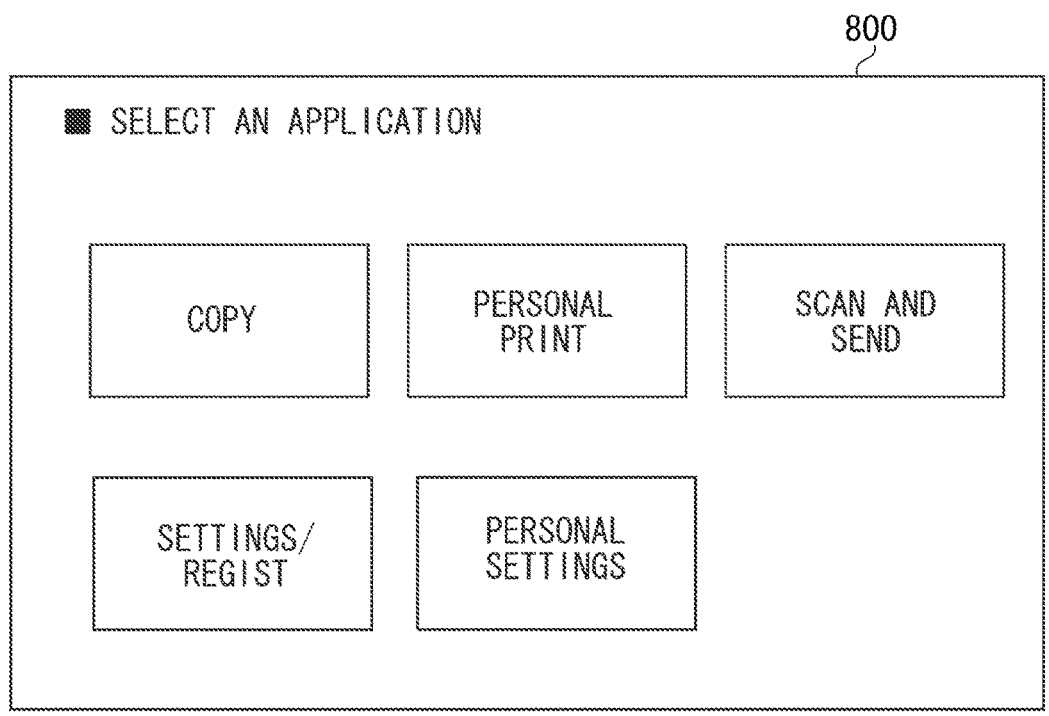
FIG. 8 is a diagram illustrating an example of a main menu screen displayed when English is set as the language for setting.

The button 602 is used for setting a language/keyboard layout. When the button 602 is pressed, a screen (not illustrated) is displayed to set a language and a layout of a software keyboard to be displayed on the operation unit 208. Thus, the language/keyboard layout is set on this screen. For example, when "English" is set as the language, the main menu screen 500 illustrated in FIG. 5 is switched to a main menu screen 800 in English as illustrated in FIG. 8. Thus, next time the user who has established the setting logs into the MFP 101, the main menu screen 800 in English is displayed instead of the main menu screen 500 in Japanese.

The button 603 can be used for establishing settings for inverting a display color on the screen, and setting up voice guidance.

FIG. 7 is a diagram illustrating an example of a job list screen 700 displayed when the personal print button 503 on the main menu screen 500 is pressed by a user who has logged into the MFP 101 with the user name "UserA@D". On the print job list, a list of print jobs input by the user with the user name "UserA@D" through his or her PC 102 and reserved is displayed. The user can select a desired document in the print job list, and then cause the printer unit 212 to perform printing by pressing a start printing button. The user can select a desired document, and delete the document from the print job list by pressing a delete button. The user can also select all the print jobs at once by pressing a select-all button.

As described above, the MFP 101 has a personalization function of providing a function suitable for a logging-in user.

<User Registration>

Now, how a user is registered will be described. There are two main ways to register a user. One is by using the user registration screen 1000 displayed when the user registration button 407 on the user selection screen 400 is pressed, and another is automatic registration of a user based on information included in a print job input by the user.

FIG. 10A is a diagram illustrating an example of the user registration screen 1000. A user name 1001, a display name 1002, and a password 1003 can be input through the user registration screen 1000. As described above, the display name is an item that is optionally set. When an OK button 1005 is pressed after these values are input, the information thus input is registered as the user information to be stored in the user information storage unit 305.

FIG. 9 is a diagram illustrating a flow of the user automatic registration based on a print job. When a print job is input from the PC 102, the personal print application 304 receives the print job. Then, the personal print application 304 analyzes input user information (job owner information) included in the print job thus received, and stores the input user information in the user information storage unit 305 as the user information.

The input user information includes a user name, and includes a domain name when the PC 102 is in a domain environment. The user name registered in the user information storage unit 305 is in a form (user name@domain) where the at sign "@" is provided between the user name and the domain name that are in the input user information. When the PC 102 is in an environment without a domain, the input user information includes no domain information. Thus, the user name is registered in a form (user name@computer name) in which a computer name follows the sign @ instead of the domain name. For example, the user information registered with the user name "UserB@PcA" in Table 1 described above is automatically registered based on a print job including input user information including B as the user name and PcA as the computer name.

As described above, the MFP 101 according to the present exemplary embodiment enables manual registration of user information as well as automatic registration based on a print job, and thus a user can easily register the user information.

In a case of the automatic registration based on a print job, an automatic setting of a user name is made that might result in registration of a name difficult to recognize by the user. In such a case, the display name may be set by using the user edit button 408 on the user selection screen 400 so that a name that is easily recognizable by the user can be displayed on the user selection screen 400.

Figure 10B:
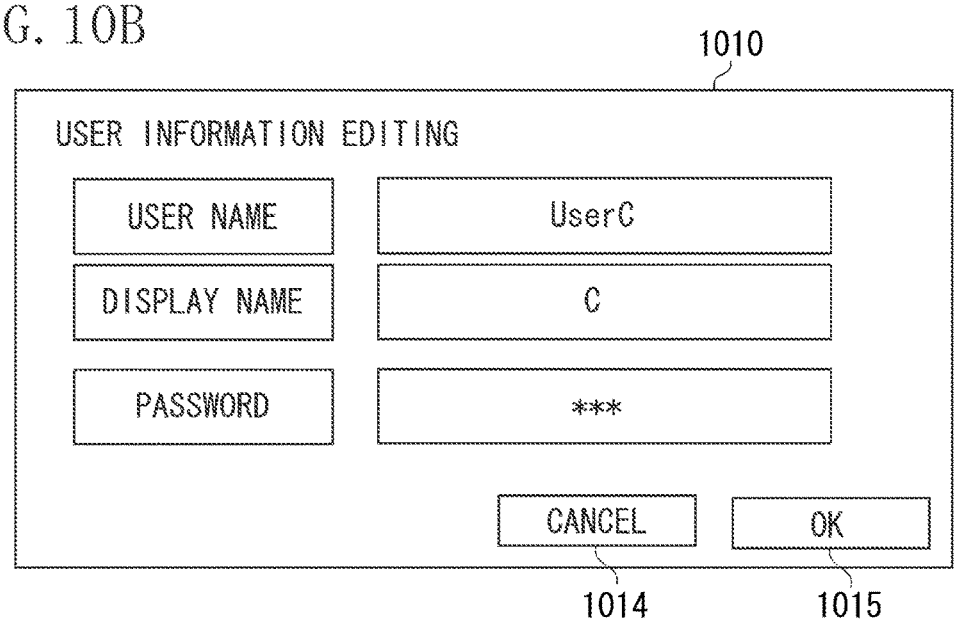

FIG. 10B is a diagram illustrating an example of a user information editing screen 1010. What are denoted by reference numerals 1011 to 1015 are the same as those denoted by the reference numerals 1001 to 1005. After the user information has been manually registered or automatically registered, the display name and the password can be changed through the editing screen 1010.

As described above, a user who uses the user selection screen 400 to log into the MFP 101 needs not to input his or her password, and can log into the MFP 101 by only pressing one of the buttons 401 to 405 that corresponds to his or her user information. Thus, when the user accidentally presses a button corresponding to another user, he or she is logged into the MFP 101 as said other user, and a screen personalized for said other user is displayed. As a result, for example, the user might mistakenly execute a print job input by another user in the personal printing. In view of this situation, a method described in the present exemplary embodiment prevents the identical names from being displayed on the buttons on the user selection screen 400, so that the risk that a user selects a wrong button is reduced.

FIG. 11 is a diagram illustrating patterns where the registration of newly added user information on the user registration screen 1000 is successful/fails. It is assumed that five pieces of user information 1101 to 1105 have been registered in the user information storage unit 305. In the figure, only the user names and the display names are illustrated as the user information.

A case 1111 represents an example where the user name is "UserD" and the display name is empty (not input). This user name "UserD" has already been registered as the user information 1105, and thus results in the registration error due to identical user names.

A case 1112 represents an example where the user name is "AddA" and the display name is "A". The user name matches with none of the registered user names, but the display name "A" has already been registered as the user information 1102, and thus results in the registration error due to overlapping of display names.

A case 1113 represents an example where the user name is "A" and the display name is empty (not input). The user name "A" matches with none of the registered user names, but the display name "A" has already been registered as the user information 1102, and thus results in the registration error in the display due to overlapping of the names. Thus, also in a case where the user name to be newly registered overlaps with the already registered display name, the registration error occurs.

A case 1114 represents an example where the user name is "A" and the display name is "AddA". The user name "A" matches with the display name of the user information 1404, but the display name "AddA" matches with none of the registered display names. Thus, there will be no other button on the user selection screen with "AddA" displayed thereon. Therefore, the user information corresponding to the case 1114 is successfully registered.

Figure 12:
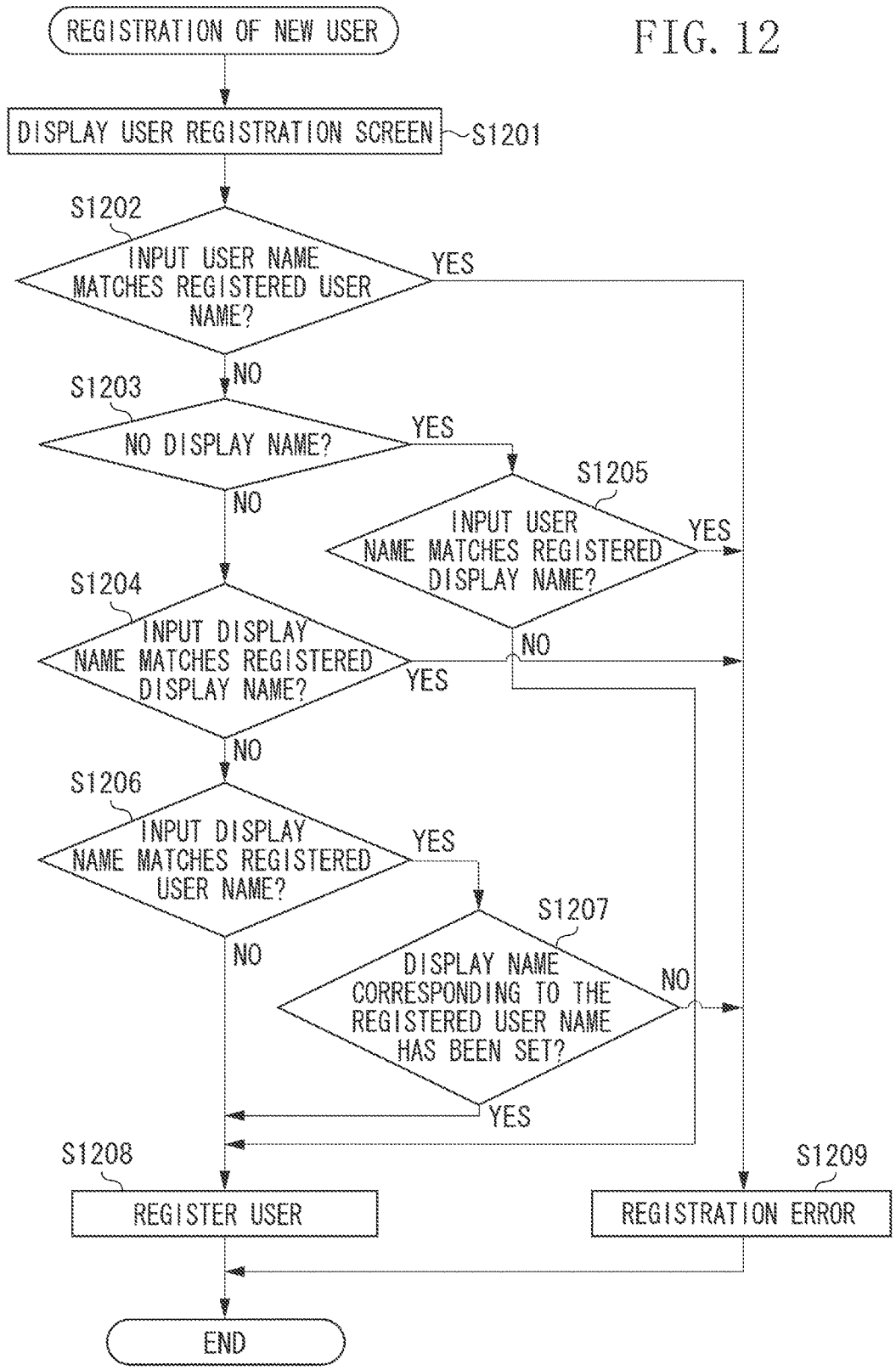
FIG. 12 is a flowchart illustrating processing of newly adding user information.

FIG. 12 is a flowchart illustrating processing of newly adding user information. A program for executing the processing illustrated in the flowchart is stored in any one of the RAM 202, the ROM 203, and the HDD 204 of the controller unit 216, and is executed by the CPU 201.

When the user registration button 407 on the user selection screen 400 is pressed, in step S1201, the CPU 201 displays the user registration screen 1000 on the operation unit 208. When at least the user name 1001 is input on the user registration screen 1000 and then the OK button 1005 is pressed, the CPU 201 executes determination processing in steps S1202 to S1205.

First, in step S1202, the CPU 201 searches the user information stored in the user information storage unit 350 to determine whether the input user name matches with any of the registered user names. Thus, whether any of the registered user names overlaps with the input user name is determined. When the CPU 201 determines that there is a user name overlapping with the input user name (Yes in step S1202), the processing proceeds to step S1209. In step S1209, the CPU 201 determines that registration error has occurred, and displays information indicating that the user name has been already registered and thus this user name cannot be registered, on the operation unit 208. This corresponds to the case 1111 in FIG. 11.

When the CPU 201 determines that there is no user name identical with the input user name (No in step S1202), the processing proceeds to step S1203 where the CPU 201 determines whether the display name is empty. When the CPU 201 determines that the display name is empty (Yes in step S1203), the processing proceeds to step S1205. In step S1205, the CPU 201 determines whether the input user name matches with any of the registered display names. Thus, whether any of the registered display names is identical with the input user name is determined. When the CPU 201 determines that there is a display name identical with the input user name (Yes in step S1205), the processing proceeds to step S1209. In step S1209, the CPU 201 determines that the registration error has occurred and displays information indicating that the user cannot be registered with the user name he or she has input, on the operation unit 208. This corresponds to the case 1113 in FIG. 11. When the CPU 201 determines that there is no display name identical with the input user name (No in step S1205), the registration is successful, and the processing proceeds to step S1208. In step S1208, the CPU 201 newly registers the user information including the input user name in the user information storage unit 305.

When the CPU 201 determines that a display name is not empty in step S1203 (No in step S1203), that is, when any character string has been input as the display name, the processing proceeds to step S1204. In step S1204, the CPU 201 determines whether the input display name matches with any of the display names of the registered users. Thus, whether any of the registered display names is identical with the input display name is determined. When the CPU 201 determines that there is a display name identical with the input display name (Yes in step S1204), the processing proceeds to step S1209. In step S1209, the CPU 201 determines that the registration error has occurred and displays a message indicating that the user cannot be registered with the display name he or she has input, on the operation unit 208. This corresponds to the case of the user information 1112 in FIG. 11. When the CPU 201 determines that there is no display name identical with the input display name in step S1204 (No in step S1204), the processing proceeds to step S1206. In step S1206, the CPU 201 determines whether the input display name matches with any of the registered user names. Thus, whether any of the registered user names is identical with the input display name is determined. When the CPU 201 determines that there is a user name identical with the input display name, the processing proceeds to step S1207. In step S1207, the CPU 201 determines whether the user with the identical user name has set the display name. When the user has not set the display name (No in step S1207), the processing proceeds to step S1209. In step S1209, the CPU 201 determines that the registration error has occurred and displays information indicating that the user cannot be registered with the display name he or she has input, on the operation unit 208.

When the CPU determines that none of the registered user names does not overlap with the input display name in step S1206 (No in step S1206) and determines that while the user names overlap, the user has set a different display name in step S1207 (Yes in step S1207), the registration is successful and the processing proceeds to step S1208. In step S1208, the CPU 201 newly registers the user information including the user name and the display name thus input in the user information storage unit 305.

As described above, when the user information is newly registered, the registration of the user name and the display name is restricted so that the names displayed on the buttons on the user selection screen do not overlap.

FIG. 13 is a diagram illustrating patterns where registration is successful/fails when the user information is edited on the user information editing screen 1010. Here, it is assumed that the user information storage unit 305 stores six pieces of user information 1301 to 1306. The figure illustrates results of change when the display name of user information 1306 is changed with respect to the user name "AddA".

A case 1311 represents an example where the display name is changed to "A". The display name "A" has already been used in the user information 1302 and thus results in the registration error due to the identical display names.

A case 1312 represents an example where the display name is changed to "UserD". The display name "UserD" is not used in the other user information, but the registered user information 1305 has the "UserD" as the user name, and no display name is set with respect to the "UserD". Thus, this case results in a registration error because a plurality of buttons is displayed showing the "UserD" on the user selection screen 400. Thus, also in a case where the changed display name overlaps with the registered user name, the registration error occurs.

A case 1313 represents an example where the display name is changed to "UserC". The registered user information 1304 has "UserC" as the user name, but has also set "C" as the display name. In this case, the registration is successful because no buttons with the same name will be displayed on the user selection screen 400.

Figure 14:
FIG. 14 is a diagram illustrating a pattern where registration fails when user information is edited.

FIG. 14 is a diagram illustrating another example of editing the user information. In this case, the user information storage unit 305 stores six pieces of user information 1401 to 1406. FIG. 14 indicates display names of user information 1405 and 1406 which are different from those of the user information 1305 and 1306 in FIG. 13.

A case 1411 represents an example where a user with the user name "AddA" deletes the display name. When the display name is deleted, the user name "AddA" will be displayed on the user selection screen 400. However, "AddA" has already been used by the registered user information 1405. Thus, this case results in the registration error because the buttons with the identical name will be displayed on the user selection screen 400.

Figure 15:
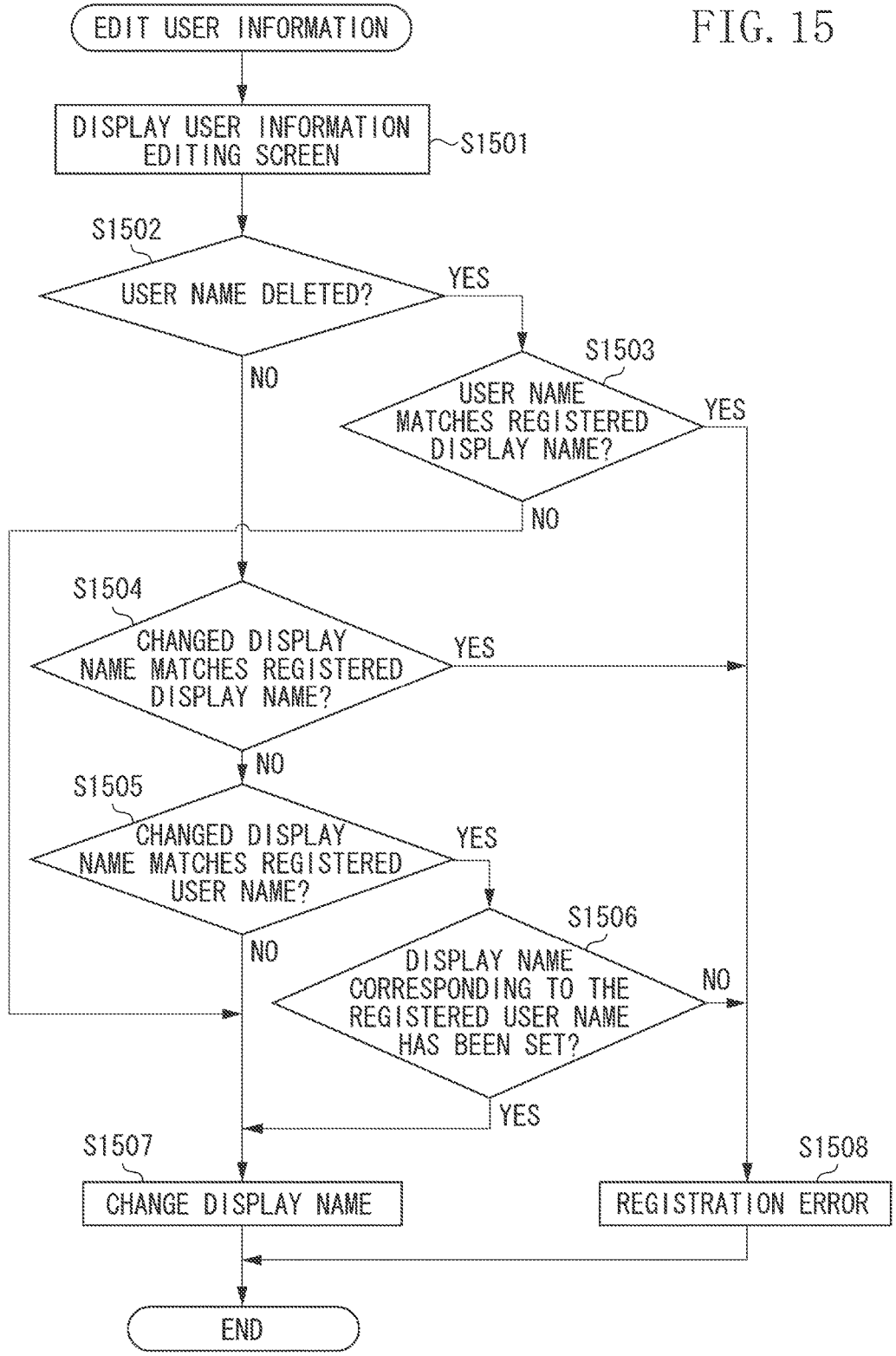
FIG. 15 is a flowchart illustrating processing of editing user information.

FIG. 15 is a flowchart illustrating processing of changing a display name. A program for executing the processing illustrated in the flowchart is stored in any one of the RAM 202, the ROM 203, and the HDD 204 of the controller unit 216, and is executed by the CPU 201.

When the user edit button 408 on the user selection screen 400 is pressed, in step S1501, the CPU 201 displays the user information editing screen 1010 on the operation unit 208. When the display name is changed on the editing screen 1010 and an OK button 1015 is pressed, the CPU 201 executes determination processing in steps S1502 to S1506.

First, in step S1502, the CPU 201 determines whether the display name has been deleted. When the CPU 201 determines that the display name has been deleted (Yes in step S1502), the processing proceeds to step S1503. In step S1503, the CPU 201 searches the user information stored in the user information storage unit 305, and determines whether the user name, corresponding to the deleted display name, matches with any of the registered display names. Thus, whether any of the registered display names is identical with the user name of a user who has deleted the display name is determined. When the CPU 201 determines that there is a display name identical with such a user name (Yes in S1503), the processing proceeds to step S1508. In step S1508, the CPU 201 determines that the registration error has occurred and indicates that the change in the display name is unacceptable, on the operation unit 208. This corresponds to the case 1411 in FIG. 14. When the CPU 201 determines that the display name has not been deleted in step S1502 (No in step S1502), the processing proceeds to step S1504. In step S1504, the CPU 201 determines whether the changed display name matches with any of the registered display names. Thus, whether any of the registered display names is identical with the changed display name is determined. When the CPU determines that there is a display name identical with the changed display name (Yes in step S1504), the processing proceeds to step S1508. In step S1508, the CPU 201 determines that the registration error has occurred due to the identical display names, and indicates that the change in the display name is unacceptable, on the operation unit 208. This corresponds to the case 1311 in FIG. 13.

When the CPU 201 determines that there are no display names identical with the changed display name in step S1504 (No in step S1504), the processing proceeds to step S1505. In step S1505, the CPU 201 determines whether the changed display name matches with any of the registered user names. Thus, CPU 201 determines whether any of the registered user names is identical with the changed display name. When the CPU 201 determines that there is a user name identical with the changed user name (Yes in step S1505), the proceeding proceeds to step S1506. In step S1506, the CPU 201 determines whether a user with the identical user name has set a display name. When no such display name has been set (No in step S1506), the processing proceeds to step S1508. In step S1508, the CPU 201 determines that the registration error has occurred and indicates that the change in the display name is unacceptable, on the operation unit 208. This corresponds to the case 1312 in FIG. 13. When the error condition is not satisfied (Yes in step S1506), the registration is successful and the processing proceeds to step S1507. In step S1507, the CPU 201 stores the changed display name in the user information storage unit 305.

As described above, in the MFP 101, also when the user name in the registered user information is changed, the registration of the display name is restricted so that identical names are not displayed on the buttons on the user selection screen 400.

As described above, in the present exemplary embodiment, when user information is newly registered, and also when registered user information is edited, the registration of the display name is restricted so that identical names are not displayed on buttons on the user selection screen 400. More specifically, the risk that a user selects a wrong button can be reduced when the user information is newly registered.

It is described above that in step S1209 in FIG. 12 and in step S1508 in FIG. 15, the CPU 201 notifies the user of the registration error. However, a message prompting a change to another display name may be used, instead of simply indicating the error. For example, when a display name to be registered matches with a registered user name of another user, a message such as "this display name cannot be registered. Please use a different display name" may be displayed.

In the above description, only the user name or the display name is displayed on a button on the user selection screen. Alternatively, an icon image and the like may be displayed together with the user name or the display name. Furthermore, a list for the sake of user selection may be used on the user selection screen 400 instead of the buttons.

Further, in the above description, the user selection screen 400 is displayed after the MFP 101 is booted, and the main menu screen 500 is displayed after user logs in. Alternatively, depending on settings of the MFP 101, the main menu 500 may be displayed first and the user selection screen 400 may be displayed after a user selects a function. For example, this configuration is effective when the copy function is available to all users, and the personal print function and the scan and send function are available to registered users only. In this case, the main menu screen 500 may be switched to a copy setting screen without displaying the user selection screen 400 when the copy button 501 is pressed on the main menu screen 500, and the user selection screen 400 may be displayed when any other button is pressed.

In the exemplary embodiment described above, the image forming apparatus has a plurality of functions such as copy, scanner, and print functions as an example. However, the present invention can be applied to an image processing apparatus having at least one of these functions. The present invention may be applied to other information processing apparatuses such as a PC, a personal digital assistant (PDA), a mobile phone, a FAX machine, a camera, a video camera, and other image viewers.

As described above, the information processing apparatus according to the exemplary embodiment described above can register as information of a user who can login, user identification information for identifying the user as well as a display name displayed instead of the user identification information. The information processing apparatus, when it displays a list of registered user information, performs display control in such a manner that the display name is displayed without presenting the user identification information as for a user whose display name has been registered, while the user identification information is displayed as for a user whose display name is not registered. When the display name or the user identification information thus displayed is selected, the information processing apparatus executes the login processing through which the user logs in as a user corresponding to the display name or the user identification information thus selected. Thus, a user who has registered a display name can log into the information processing apparatus by simply selecting his or her display name. When identical names are displayed on the selection screen, the user might select information of another user by mistake. To prevent such a selection error, the information processing apparatus according to the present exemplary embodiment restricts the registration of display names so that identical names are not displayed on the selection screen.

More specifically, when information input as a display name of a user to be newly registered matches with the display name of another user whose user information has been already registered, registration of the display name thus input is restricted. Thus, the display name that is identical with those of other users can be prevented from being registered. Furthermore, also when information input as a display name of a user to be newly registered matches with the user identification information of another user whose user name has been registered but whose display name is not registered, registration of the display name thus input is restricted. Thus, the display name that is identical with the user identification information of another user whose display name is not registered can be prevented from being registered.

Furthermore, also when information input as user identification information of a user to be newly registered matches with the display name of another user whose user information has been registered, registration of the user identification information thus input is restricted. Thus, the user identification information of a user to be newly registered, even when his or her display name is not registered, can be prevented from being identical with the display names of other users.

When registered user information is edited, if the display name of the user to be edited is deleted and the user identification information of this user is the same as the display name of another user, the deletion of the display name is restricted. Thus, the user identification information, displayed as a result of deleting the display name, can be prevented from being identical with the display name of another user. Furthermore, also when the display name of the user to be edited is changed to be the same as the registered display name of another user, such change in the display name is restricted. Thus, the changed display name can be prevented from being identical with the display name of the other user. Furthermore, when the display name of the user to be edited is changed to be the same as identification information of another registered user whose display name is not registered, such change in the display name is restricted. Thus, the changed display name can be prevented from being identical with the user identification information of another user whose display name is not registered.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-138893, filed Jul. 10, 2015, which is hereby incorporated by reference herein in its entirety.

What is claimed is:

1. An image forming apparatus configured to control printing of a print job by a printing unit based on information about a user who has logged in, the image forming apparatus comprising: at least one processor; and at least one memory coupled to the at least one processor and having stored thereon instructions that, when executed by the at least one processor, cooperate to act as: a registration unit configured to register, as user information about a user who can log in to the image forming apparatus, a user name for identifying the user and, instead of registering the user name, the registration unit is capable of registering a display name displayed, an authentication unit configured to perform authentication based on an input password and the user name, a display control unit configured to display a selection screen regarding login processing, wherein the selection screen includes at least a first software key and a second software key, wherein, in a case where the display name has been registered by the registration unit, the display name is displayed as a name of the first software key and, in a case where the display name has not been registered by the registration unit, the user name is displayed as the name of the first software key, and wherein the second software key is configured to display an authentication screen for allowing the user to input the password and the user name, a login processing unit configured to execute, when the first software key is selected or when authentication is granted by the authentication unit, login processing through which a user corresponding to the first software key can log into the image forming apparatus or a user corresponding to the input user name can log into the image forming apparatus, and a restricting unit configured to restrict registration of the display name by the registration unit so that identical names are not displayed a list of user information by the display control unit, wherein, in a case where a display name corresponding to the already registered user name has been already set, the restricting unit allows registration of a display name identical with a user name that has been already registered, and wherein, when the login processing is performed by the login processing unit, the display control unit displays a screen for instructing image formation including printing to be performed.

2. The image forming apparatus according to claim 1, wherein, if a display name input from a user matches with a display name of another user whose user information has been registered, the restricting unit is configured to restrict a registration of the input display name when user information is newly registered.

3. The image forming apparatus according to claim 1, wherein, if an input display name matches with a user name of another user whose user information has been registered but display name is not registered, the restricting unit is configured to restrict a registration of the input display name when user information is newly registered.

4. The image forming apparatus according to claim 1, wherein, if a display name has not been input and an input user name matches with a display name of another user whose user information has been registered, the restricting unit is configured to restrict a registration of the input user name when user information is newly registered.

5. The image forming apparatus according to claim 1, wherein, if a display name of a user to be edited is deleted and a user name of the user matches with a display name of another user whose user information has been registered, the restricting unit is configured to restrict deletion of the display name of the user to be edited when registered user information is edited.

6. The image forming apparatus according to claim 1, wherein if a changed display name of a user to be edited is identical with a display name of another user whose user information has been registered, the restricting unit is configured to restrict a registration of the changed display name when registered user information is edited.

7. The image forming apparatus according to claim 1, wherein, if a changed display name of a user to be edited is identical with a user name of another user whose user information has been registered without registering the display name of the another user, the restricting unit is configured to restrict a registration of the changed display name when registered user information is edited.

8. The image forming apparatus according to claim 1, wherein the registration unit is configured to register a password together with the user name of the user who can log into the image forming apparatus.

9. The image forming apparatus according to claim 1, wherein the executed instructions further cooperate to act as a providing unit configured to provide a personalization function corresponding to a user who has logged in when the login processing is executed by the login processing unit.

10. The image forming apparatus according to claim 9, wherein the providing unit is configured to provide a function in which a print job input from an external apparatus is reserved, wherein a list including the print job input by a user who has logged into the image forming apparatus is displayed, and wherein printing based on the print job is performed when a print command is received from the user.

11. The image forming apparatus according to claim 1, wherein, in a case where the image forming apparatus controls printing of a print job by the printing unit through instructions instructing image formation including printing to be performed, the printing unit prints an image onto a recording medium.

12. The image forming apparatus according to claim 1, wherein the executed instructions further cooperate to act as a reading unit configured to read an image on a document and generate image data configured to be utilized in instructing the image formation including printing to be performed.

13. A control method for an image forming apparatus configured to control printing of a print job by a printing unit based on information about a user who has logged in, the control method comprising: registering, as user information about a user who can log into the image forming apparatus, a user name for identifying the user and, instead of registering the user name, the control method is capable of including registering a display name displayed; performing authentication based on an input password and the user name; displaying a selection screen regarding login processing, wherein the selection screen includes at least a first software key and a second software key, wherein, in a case where the display name has been registered, the display name is displayed as a name of the first software key and, in a case where the display name has not been registered, the user name is displayed as the name of the first software key, and wherein the second software key is configured to display an authentication screen for allowing the user to input the password and the user name; executing, when the first software key is selected or when and is granted, login processing through which a user corresponding to the first software key can log into the image forming apparatus or a user corresponding to the input user name can log into the image forming apparatus; and restricting registration of the display name so that identical names are not displayed on a list of user information, wherein, in a case where a display name corresponding to the already registered user name has been already set, restricting, includes allowing registration of a display name identical with a user name that has been already registered, and wherein, when the login processing is performed, displaying includes displaying a screen for instructing image formation including printing to be performed.

14. A non-transitory computer readable storage medium storing a program to cause a computer to perform a control method for an image forming apparatus configured to control printing of a print job by a printing unit based on information about a user who has logged in, the control method comprising: registering, as user information about a user who can log into the image forming apparatus, a user name for identifying the user and, instead of registering the user name, the control method is capable of including registering a display name displayed; performing authentication based on an input password and the user name; displaying a selection screen regarding login processing, wherein the selection screen includes at least a first software key and a second software key, wherein, in a case where the display name has been registered, the display name is displayed as a name of the first software key and, in a case where the display name has not been registered, the user name is displayed as the name of the first software key, and wherein the second software key is configured to display an authentication screen for allowing the user to input the password and the user name; executing, when the first software key is selected or when authentication is granted, login processing through which a user corresponding to the first software key can log into the image forming apparatus or a user corresponding to the input user name can log into the image forming apparatus; and restricting registration of the display name so that identical names are not displayed on a list of user information, wherein, in a case where a display name corresponding to the already registered user name has been already set, restricting includes allowing registration of a display name identical with a user name that has been already registered, and wherein, when the login processing is performed, displaying includes displaying a screen for instructing image formation including printing be performed.

* * * * *